United States Patent [19]

Johnson et al.

[11] 4,249,913

[45] Feb. 10, 1981

[54] ALUMINA COATED SILICON CARBIDE ABRASIVE

[75] Inventors: Gerard F. Johnson, Wilmington, N.C.; Peter W. Schilke, Scotia, N.Y.

[73] Assignee: United Technologies Corporation, Hartford, Conn.

[21] Appl. No.: 41,230

[22] Filed: May 21, 1979

Related U.S. Application Data

[63] Continuation of Ser. No. 831,836, Sep. 9, 1977, abandoned.

[51] Int. Cl.³ .............................................. B24D 11/00
[52] U.S. Cl. ........................................ 51/295; 51/307; 51/308; 51/309; 415/172 A; 416/241 R; 427/215; 428/380; 428/404
[58] Field of Search ................. 51/295, 307, 308, 309; 427/214, 215; 428/380, 404; 415/172 A; 416/241

[56] References Cited

U.S. PATENT DOCUMENTS

| | | | |
|---|---|---|---|
| 3,508,890 | 4/1970 | Fontanella | 51/295 |
| 3,779,726 | 12/1973 | Fisk et al. | 51/295 |

*Primary Examiner*—Donald J. Arnold
*Assistant Examiner*—W. Thompson
*Attorney, Agent, or Firm*—Charles G. Nessler; Edward J. Timmer

[57] ABSTRACT

Disclosed is an improved abrasive material particularly useful as a dispersoid in metal matrices to provide articles of use having superior abrasive properties, especially at elevated temperatures. The improved abrasive material typically comprises silicon carbide particulate, the individual particles of which have a predominantly alumina coating thereon to inhibit dissolution of the particles in the metal matrix at high temperatures. The invention finds special application in abrasive blade tips for service in gas turbine engines, the tips comprising a nickel base or cobalt base superalloy having the alumina coated silicon carbide particles dispersed therein.

10 Claims, No Drawings

ALUMINA COATED SILICON CARBIDE ABRASIVE

This application is a continuation of Ser. No. 831,836, filed Sept. 9, 1977, now abandoned.

BACKGROUND OF THE INVENTION

1. Field of the Invention

The present invention relates to abrasive materials and their manufacture and, more particularly, to abrasive particulate and its dispersal in a metal matrix to provide an article of use having superior abrasive properties.

2. Description of the Prior Art

Improved efficiency is an increasingly important factor in the development of gas turbine engines. Such engines have rows of rotating blades fixtured within a generally cylindrical case and leakage of gas between the ends of the blades and case contributes toward inefficiency. In current engine design, this leakage is minimized by blade and sealing systems in which the blade tips rub against a seal which is attached to the interior of the engine case. Generally, it has been found most desirable to construct the system such that the blade tips are harder and more abrasive than the seal and thus cut into the seal during certain stages of engine operation to establish essentially a zero clearance therebetween. Previous abrasive blade tips have been constructed of various materials including certain nickel base superalloys, U.S. Pat. No. 2,994,605, and nickel matrices having tungsten carbide particles randomly dispersed therein, U.S. Pat. No. 3,199,836. However, as a result of the increasing temperatures encountered in gas turbine engines, especially in the turbine section, and of the presence of corrosive gases, the abrading and cutting effectiveness of these blades tips has not been entirely satisfactory. The prior art blade tips have proved especially deficient when used in conjunction with ceramic seal materials which have been developed for gas turbine engine use, for example, graded ceramic seals based on zirconia.

Silicon carbide, being a high temperature hard refractory material would appear particularly useful as an abrasive if incorporated in a metal binder. But the inclusion of silicon carbide, by itself, in metal matrices at elevated temperatures can be calculated and observed to result in interaction with superalloy matrix metals at the temperatures of 2000° F. or higher. Silicon carbide is not sufficiently thermodynamically stable in contact with superalloys. And with the interaction, the hardness and desired cutting properties of the silicon carbide will be lost.

Silicon carbide particles have been included in metal matrices, such as in coated abrasives described in Fontanella U.S. Pat. No. 3,508,890. There, particles positioned on an organic backing are coated with aluminum; optionally, the surface of the aluminum is converted to an oxide, as this is said to aid polishing.

Fisk et al U.S. Pat. No. 3,779,726 describes a method of making metal-abrasive tools containing silicon carbide or other grits. The method comprises encapsulating the grit in a porous metal coating and then impregnating the encapsulating layer with a metal to unite the particles.

However, these prior inventions, being oriented toward abrasives useful at temperatures far below those of gas turbines, do not comprise or teach ways of providing materials which are useful at high temperatures.

SUMMARY OF THE INVENTION

The present invention contemplates an improved abrasive material particularly useful as a dispersoid in a metal matrix to provide an article of use having superior abrasive properties, especially at elevated temperatures. Typically, the invention utilizes abrasive silicon carbide particulate, the individual particles of which have a coating substantially of alumina ($Al_2O_3$) thereon. The alumina coating functions to inhibit diffusion or dissolution of the dispersed silicon carbide particles into the metal matrix during service at elevated temperature and thereby increases the useful life of the particulate as an abrasive dispersoid. The invention also envisions providing an intermediate coating of silica ($SiO_2$) between the particle and outer alumina coating to improve high temperature bonding by formation of a mullite phase ($3Al_2O_3.2SiO_2$) therebetween. According to the invention, the alumina and silica coatings are preferably applied by sputtering or vapor deposition processes.

The alumina coated silicon carbide particulate can be dispersed in a wide variety of metal matrices to suit particular needs. Dispersal of the particulate can be effected by powder metallurgical and casting techniques as well as others.

The invention finds special application in abrasive blade tips for service in gas turbine engines. Such blade tips typically comprise the alumina coated silicon carbide particles dispersed in nickel base or cobalt base superalloy matrices. Abrasive blade tips produced in accordance with the present invention have been found highly effective in abrading and cutting ceramic seal materials at elevated temperatures.

These and other objects, advantages and uses of the present invention will become more readily apparent from the following detailed description of the preferred embodiments.

DESCRIPTION OF THE PREFERRED EMBODIMENT

As previously discussed, the improved abrasive material of the present invention finds particular usefulness as a dispersoid in metal matrices to provide articles of use having excellent high temperature abrasive properties. One such article of use is the abrasive blade tip used in the blade and seal systems of modern gas turbine engines. For the sake of illustration, the present invention will be described in detail hereinbelow with reference to such blade tips.

In modern gas turbine engines, the abrasive blade tips must be capable of providing effective abrading and cutting action into the seal material at very high temperatures. In the turbine section of the engine, for example, blade tip temperature may approach or exceed 2000° F. during normal engine operation. Under these severe conditions, prior art blade tips have not been entirely satisfactory, especially when used in conjunction with ceramic seal materials. The present invention provides an improved abrasive material which can be dispersed in a nickel base or cobalt base superalloy matrix, or other appropriate matrix, to provide an abrasive blade tip characterized by superior ability to abrade and cut seal materials, including ceramic seal materials, at the very high temperatures encountered in engine operation. More specifically, the invention involves the discovery that silicon carbide particulate, when dispersed in nickel base and cobalt base superalloy matrices, exhibits superior abrasive ability and that by coating the individual particles of silicon carbide with alumina, such superior abrasive characteristics can be maintained at turbine operating temperatures.

Commercially available silicon carbide particulate appears satisfactory in sizes from 8 mils to 30 mils average diameter, although the particular size utilized can of course be varied as desired depending on the particular abrasive application. In order to inhibit the diffusion or dissolution of the particles in the metal matrix at high temperatures, thereby maintaining abrasive ability, the individual particles are coated with commercially available alumina ($Al_2O_3$) or, for better bonding, with a first coating of silica ($SiO_2$) followed by a second coating of alumina. The use of the intermediate silica coating fosters improved high temperature bonding of the alumina coating to the particle by the formation of a mullite phase ($3Al_2O_3.2SiO_2$) therebetween during high temperature service. Or, if desired, the duplex coated particles can be suitably heat treated prior to dispersal in the matrix to effect formation of the mullite phase. The alumina and silica coatings can be conveniently deposited on the individual silicon carbide particles by sputtering, physical vapor deposition and chemical vapor deposition techniques wherein the particles are rotated slowly during deposition. Of course, the thickness of the coatings can be varied as desired. For abrasive blade tip applications, an alumina coating of about 0.1 mil in thickness has been found satisfactory.

As those skilled in the art will recognize, dispersal of the alumina coated silicon carbide particulate in the nickel base or cobalt base superalloy matrices can be effected by a variety of techniques including, but not limited to, powder metallurgy, casting and others. Powder metallurgical techniques are preferred since random dispersal of the particles is optimized. For example, a preferred technique is to mix the coated silicon carbide particles and superalloy powder in desired amounts and then hot press the mixture to a final or intermediate consolidated shape. However, in some cases, it may be desirable to provide for a nonrandom dispersion, that is, the particulate being segregated in certain regions of the tip, such as near the end contacting the seal material. A significant advantage of the present invention is that the alumina coated silicon carbide particulate can be dispersed in a wide variety of matrix alloys with no significant deleterious interaction therebetween. This feature allows the matrix alloy to be selected and tailored to the specific environment and conditions of service, resulting in an overall improved abrasive blade tip or other article of use. For abrasive blade tips, various nickel base and cobalt base alloys can be utilized, examples of which are a nickel base alloy of nominal composition, by weight, 21–25% Cr, 4.5–7% Al, 4–10% W, 2.5–7% Ta, 0.02–0.15% Y, 0.1–0.3% C, balance nickel and a cobalt base alloy of nominal composition, by weight, 18–30% Cr, 10–30% Ni+Fe, 5–15% W+Mo, 1–5% Ta+Cb, 0.05–0.6% C, 3.5–8.0% Al, 0.5–2.0% Hf, 0.02–0.1% Y, balance cobalt. Blade tips having the alumina coated silicon carbide particulate dispersed in these alloys can be attached to the end of a nickel base or cobalt base superalloy turbine blade by solid state diffusion bonding, TLP ® bonding, brazing and other processes.

Those skilled in the art will recognize that the amount of alumina coated silicon carbide particulate dispersed in the alloy matrix can be varied as desired. In blade tip applications, the amount has ranged from 45 volume percent for 8 mil diameter particles to 30 volume percent for 15 mil diameter particles. In addition, other abrasive particulate may be simultaneously dispersed in the matrix to provide useful properties. For example, hot pressed silicon nitride ($Si_3N_4$) can be dispersed along with alumina coated silicon carbide. Abrasive blade tips of the invention have been wear tested and found to possess acceptable abrasive properties to tip temperatures of about 2100° F., the matrix alloy being a cobalt base alloy.

Although the following invention has been shown and described with respect to a preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A high temperature particulate, useful as an improved dispersoid in a metal matrix, comprising silicon carbide particulates having a predominantly alumina coating, the coating being resistive to diffusion or dissolution in superalloys at temperatures of 2000° F. or more.

2. A material for high temperature wear and rubbing resistance, comprising, a high temperature superalloy matrix having silicon carbide particles dispersed therein, the particles having a predominantly alumina coating, wherein the alumina coating is resistive to diffusion or dissolution in superalloys at temperatures of about 2000° F.

3. A material for high temperature wear and rubbing resistance comprising a high temperature superalloy matrix having silicon carbide particles dispersed therein, the particles having a first coating to improve bonding and a second coating of predominately alumina to resist diffusion or dissolution in superalloys at temperatures of about 2000° F., wherein the first coating is selected from the group consisting of silica and mullite.

4. A high temperature particulate material useful as an improved dispersoid in a metal matrix, comprising silicon carbide particulates having a first coating to improve bonding and a second coating of alumina to resist diffusion or dissolution in superalloys at temperatures of 2000° F. or more, wherein the first coating material is selected from the group consisting of silica and mullite.

5. The abrasive material of claim 1 wherein the thickness of the alumina coating is about 0.1 mil.

6. In the method for making a silicon carbide and metal matrix abrasive article useful at elevated temperatures, the improvement comprising, depositing an alumina coating on individual silicon carbide particles and dispersing the coated particles in a metal matrix, the alumina coating inhibiting diffusion of the particles into the matrix at elevated temperatures and increasing the useful life of the article.

7. The method of claim 6 wherein the coated particles are dispersed in the metal matrix by powder metallurgical techniques including mixing the coated particles with metal powder and then pressing the mixture into a consolidated body.

8. The method of improving the durability of high temperature silicon carbide particulate-containing metal which comprises coating the silicon carbide particulates, prior to inclusion within the metal, with at least one material selected from the group consisting of alumina, silica, mullite.

9. An abrasive blade tip for a gas turbine engine blade comprised of a superalloy having silicon carbide particulate of an average particle dimension of from 8 to 30 mils, the particulate having an alumina coating, the coating being resistive to diffusion into the superalloy at temperatures of about 2000° F.

10. A composite gas turbine blade made of a superalloy, having a tip according to claim 9.

* * * * *